United States Patent Office 2,821,161
Patented Jan. 28, 1958

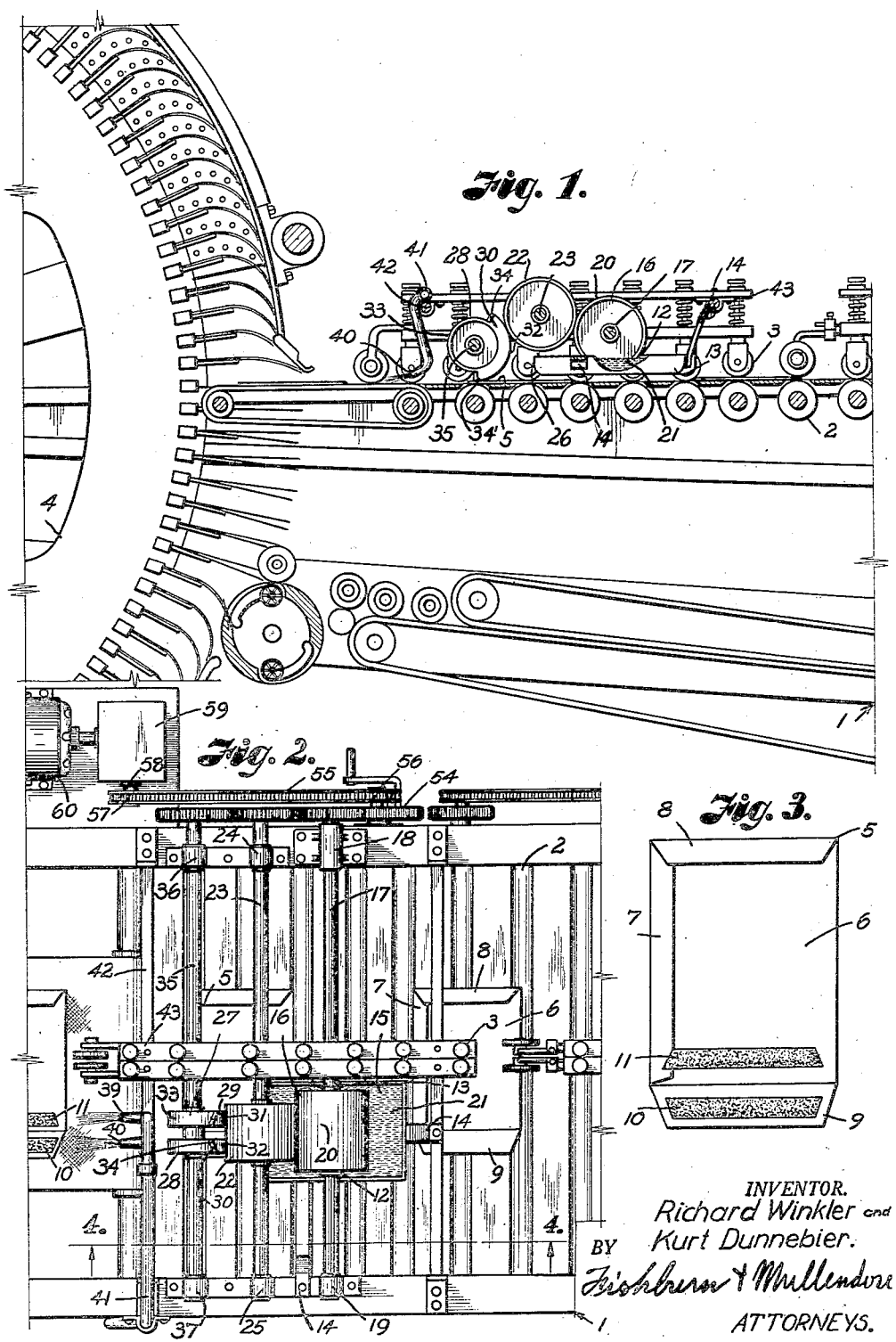

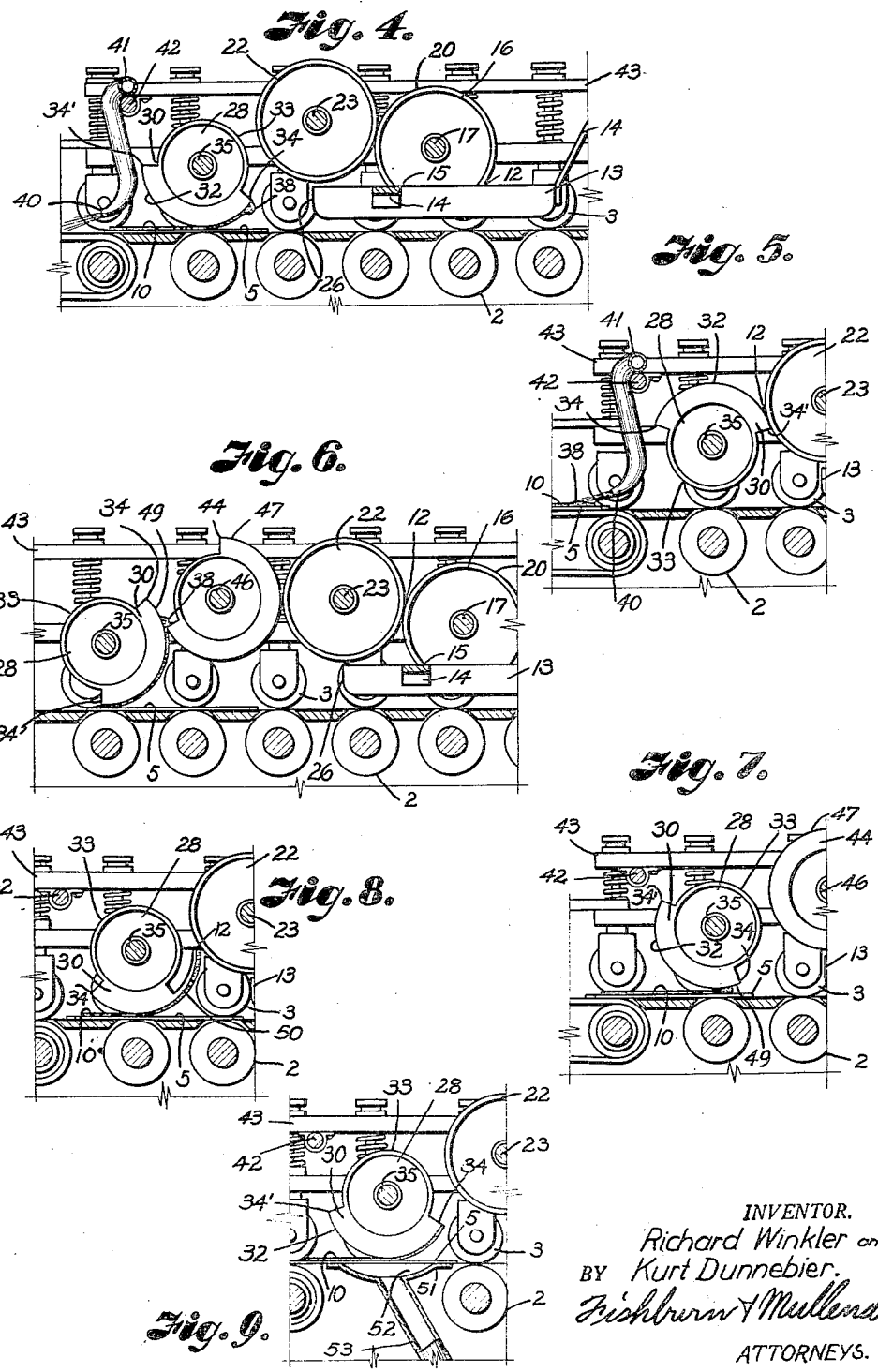

2,821,161

APPARATUS FOR APPLYING A PRESSURE SEALING GUM TO ENVELOPES AND SIMILAR WORKPIECES

Richard Winkler, Rengsdorf, and Kurt Dunnebier, Neuweid (Rhine), Germany, assignors to Berkley Machine Company, Kansas City, Mo., a corporation of Missouri Application December 1, 1954, Serial No. 472,452

Claims priority, application Germany December 8, 1953

9 Claims. (Cl. 118—63)

This invention relates to an apparatus for applying a pressure sealing gum such as a latex composition, to envelopes and similar workpieces.

Heretofore this type of gum is difficult to apply from above in the manner of ordinary gums that are to be moistened when a seal is to be effected. This is because it has been practically impossible to obtain the thin layer of latex that is needed for a sharply defined profile of gumming.

These difficulties have been solved in part by applying the gum from underneath but since conventional rotary type envelope making machines discharge the envelopes with the sealing flaps in face-up position, the latter method necessitates turning over of the envelopes to receive the gum from beneath and re-inverting of the envelopes when they are delivered into the drier.

The gum gathers in the form of globules under the scraper and eventually builds-up to such an extent that it interferes with normal operation of the machine. Due to the rolling action of the transfer rollers and the effect of gravity, the gum increases in thickness on the trailing portions of the profile applicator and collects in a drop or gob which transfers in an irregular manner onto the envelope.

It is therefore a principal object of the present invention to provide an apparatus for successfully effecting profile gumming from above the path of the envelopes and effecting a clean and sharply defined profile of the gum applied to the envelopes.

A further object of the invention is to provide applicator segments for transferring and applying the gum so that the trailing portions of the applicator segments are free of gum to spread the gum that collects in excess amount at the point where the transfer and applicator segments move apart.

A further object of the invention is to provide an applicator in association with means to compensate for different thicknesses in the envelopes or workpieces brought about by the seams, folds and the like across which the gum is to be applied.

Another object of the invention is to provide a mechanism for evenly distributing the gum by means of an air blast directed upon the thick portion of the applied gum.

In accomplishing these and other objects of the invention, as hereinafter pointed out, we have provided improved methods and apparatus illustrated in the accompanying drawings wherein:

Fig. 1 is a longitudinal section through a portion of a continuous rotary-type envelope making machine equipped with a mechanism for applying a pressure sealing material such as latex or latex composition in accordance with the present invention.

Fig. 2 is a plan view of the latex applying mechanism.

Fig. 3 is a plan view of an envelope showing the profile gumming thereon.

Fig. 4 is an enlarged section on the line 4—4 of Fig. 2.

Fig. 5 is a similar section showing the air blast for blowing the thick portion of the gum forwardly into the thinner portion to provide a uniform thickness thereof.

Fig. 6 is a section similar to Fig. 4 of a modified form of the invention in which a pair of segmental transfer segments are used in cooperation with the applicator segments in providing a clean or uncoated applicator face on the retractive ends of the applicator faces to effect spreading of the gum that results at the separation point of the segments.

Fig. 7 is a similar section showing a more advanced position of the applicator segments and showing the thickened gum being spread-out under the uncoated face portion of the applicator.

Fig. 8 is a further modified form of the invention wherein the applicator segment is provided with a resilient trailing portion that is yieldable relatively to the transfer roller so as to reduce the thickness of the coating transferred thereto.

Fig. 9 is a similar section showing a further modified form of the invention wherein an air cushion is maintained under the path of the envelopes to support the envelopes in contact with the applicator face regardless of the different thicknesses which result from seams, side flaps, folds and the like.

Referring more in detail to the drawings, and first to the form of invention illustrated in Figs. 1 to 5 inclusive:

1 designates a portion of a rotary-type envelope making machine of the type disclosed in United States Letters Patent No. 1,774,536, issued September 2, 1930, and wherein blanks are folded into envelopes and discharged through a fixed path by a series of rollers 2 acting in conjunction with pressure rollers 3 for delivering the envelopes into a drier 4. The drier 4 may be of the type illustrated and described in United States Letters Patent No. 1,834,567, issued December 1, 1931. The envelopes 5 are of the general type illustrated in Fig. 3 and are delivered by the rollers with the back flaps 6 and 7 and the bottom flap 8 folded and sealed, as described in the above mentioned patent, and with the closure flaps 9 in open position to receive thereon a gum stripe 10 while a complementary gum stripe 11 is applied across the upper faces of the back flaps 6 and 7, to provide a pressure seal type envelope. That is, when an envelope is to be used a seal is effected by folding the flap 9 to bring the gum stripe 10 into contact with the gum stripe 11 and slightly pressing the closure flap against the body portion of the envelope.

The gum stripes 10 and 11 are applied in accordance with the present invention by an apparatus 12 that is supported above the path of travel of the envelopes and over the rollers 2 at the delivery end of the envelope machine 1 and just ahead of the drier 4. The apparatus 12 includes a pan or vessel 13 that is supported by a cross bars 14 having its ends supported by the side frame of the machine. The pan 13 has an open top 15 and rotatably mounted therein is a gum pick-up roller 16. The pick-up roller 16 is carried on a cross shaft 17 that has its ends suitably journalled in bearings 18 and 19, as shown in Fig. 2. The pick-up roller 16 is of a diameter so that the peripherical face 20 thereof dips within the body of sealing gum 21 contained in the pan 13. Rotatably mounted in contact with the face of the pick-up roller 16 is a transfer roller 22 having less width than the width of the pick-up roller. The transfer roller 22 is carried on a cross shaft 23 having its ends journalled in suitable bearings 24 and 25 on the side frame and which are of sufficient height to support the transfer roller 22 in tangential contact with the pick-up roller 16 and project forwardly over the front wall 26 of the pan for contact with applicators 27 and 28. The applicators preferably comprises spaced apart disk-segments 29 and 30 having arcuate faces 31 and 32 conforming in length and width to the area of the gummed stripes 10 and 11. The faces 31 and 32 are off-set with respect to the opposite diametrical portions 33 of the disk segments as indicated at 34 and 34'.

The segmental disks preferably are located just above one of the forwarding rollers 2 on a shaft 35 carried by bearings 36 and 37. The transfer roller 22 is of greater width than the maximum spacing of the segmental disks.

As above pointed out, the gum tends to roll-up between the face of the transfer roller and the retractive portion of the applicating faces 31 and 32 to collect in a drop of tacky gum 38 at the rear-most off-set 34, as best shown in Fig. 4, therefore when the applicating face rolls into contact with the envelope (as shown in Fig. 4) the rear portion of the applicator applies a thicker film to trailing portions of the gum stripes and to overcome this difficulty, nozzles 39—40 are directed onto the stripes of gum 10 and 11 in the direction of movement of the envelopes as the gum stripes emerge from under the applicating faces. The nozzles are connected with an air supply duct 41 leading to a suitable source of air supply. The nozzles are suitably supported on a transverse rod 42 that is carried by the frame 43 which supports the pressure rollers 3 previously described. The air blasts blow the thick portion of the gum forwardly along the gum stripes so that the gum is uniformly distributed along the length thereof when the envelopes are delivered into the drier.

The form of invention illustrated in Fig. 6 employs segment members 44 that are interposed between the transfer roller 22 and the applicator segments 27 and 28. The segment members 44 are suitably mounted on a shaft 46 and have peripherical faces 47 adapted to be coated with gum from the transfer roller 22. The faces 47 of the segment members 44 also contact the applicating faces 31 and 32 of the applicators 27 and 28, however, the applicators and segment members are so timed that the trailing edges of the coated face of the segment members leave the applicating faces at a suitable distance ahead of the off-set 34 so that the trailing portions 49 of the applicating faces are free of gum so as to spread out the drops of gum that result as the segment members 44 move out of contact with the applicating faces. With this arrangement the uncoated portion of the applicating faces spread-out the drops of gum to effect a uniform application of the gum to the envelopes.

The form of invention illustrated in Fig. 8 is similar to the first described form with the exception that the rear portion of the applicating face 50 comprise resilient arcuate tongues which are developed so as to control the amount of gum that is transferred thereon from the transfer roller.

It so happens that the side seams, flaps and the like portions of the blanks, necessary in forming an envelope, cause the envelope to have different thicknesses across which the gum stripes may be applied. Therefore, portions of the envelope may not be contacted by the applicating faces and to avoid this difficulty a pressure bar 51 is substituted for one of the rollers 2 and the upper face of the bar is provided with an arcuate recess 52 in registry with the applicator segments, or if desired, only with the applicator segment that applies the gum stripe to the body of the envelope. A blast of air is directed into the recess 52 through a duct 53 which retains the envelopes in contact with the applicating faces as the gum is rolled thereon incidental to actuation of the applicators.

The shafts of the segments, transfer, and pick-up rollers are interconnected by a gear train 54, as shown in Fig. 2 and one of the gears of the train is driven by a chain 55 operating over a sprocket 56 connected with the gear train and over a sprocket 57 on the out-put shaft 58 of a speed-reduction gearing 59 that is driven by a suitable motor 60.

From the foregoing it is obvious that we have provided an apparatus for successfully applying latex and latex composition to workpieces from above the path of travel thereof in a manner to distribute the drop of gum that is left upon the retractive face portions of the gum applicators.

It is also obvious that we have provided gum pick-up, transfer and applicator arrangements that eliminate build-up of gum thereon that would ordinarily interfere with a clearly defined profile gumming.

What we claim and desire to secure by Letters Patent is:

1. An apparatus for applying a pressure sealing gum to work pieces while the work pieces are under movement along a fixed path of travel, a rotary member having an applicating face of a width corresponding with the width of an area on the work pieces to which the gum is to be applied and having a forward end and a trailing end spaced apart according to length of said area to which the pressure sealing gum is to be applied, means for supporting said rotary member to bring the applicating face into contact with the work pieces with the forward end of the applicating face moving in the direction of movement of the work pieces, means for containing a supply of pressure sealing gum, gum pickup and transfer means for picking up the pressure sealing gum from said supply means and for carrying the pressure sealing gum in transfer contact with the applicating face of the rotary member while the forward end of the applicating face is moving from said pickup and transfer means and carrying a substantially uniform coating of pressure sealing gum from said contact point to said work piece and while excess of said gum is being pushed backwardly toward the trailing end of the applicating face and which pressure sealing gum tends to collect on said trailing end in a blob when the trailing end of the applicating face rides out of said transfer contact, and means for spreading the blob of pressure sealing gum to prevent a thickened terminal at the trailing end of said area to which the pressure sealing gum is applied to said work pieces.

2. An apparatus for applying pressure sealing gum to work pieces as described in claim 1 wherein said means for spreading the blob comprises a nozzle forwardly of the rotary member and arranged to discharge a pressure medium into propelling contact with the said blob to spread the blob forwardly along said area.

3. An apparatus for applying pressure sealing gum to work pieces as described in claim 1 wherein said means for spreading the blob comprises a resilient tongue forming the trailing end of the applicating face, said tongue being yieldable for permitting the blob to pass upon the gum pickup and transfer means.

4. An apparatus for applying pressure sealing gum to work pieces as described in claim 1 wherein said pickup and transfer means includes pickup and transfer members having arcuate faces, means for rotatably supporting said pickup and transfer members with said arcuate faces in rolling contact and the arcuate face of the transfer member in rolling contact with said applicating face of the rotary member, said transfer member having a driving connection with said rotary member to keep the said arcuate face of the transfer member and applicating face of the rotary member in timed relation with the trailing end of the applicating face trailing a corresponding trailing end of the arcuate face of the transfer member to leave a trailing portion of said applicating face free of contact by the arcuate face of the transfer member to accommodate the blob upon said trailing portion, and wherein said spreading means is the trailing face portion of said applicating face.

5. An apparatus for applying spaced apart parallel stripes of pressure sealing gum to the back and closure flap, respectively, of an envelope while the envelopes are under movement along a fixed path of travel, coaxially spaced apart rotary members, each having an applicating face of a width corresponding with the width of the respective stripes to be applied and having a forward end and a trailing end spaced apart according to length of said stripes, means for supporting said rotary members to bring the applicating faces into contact with said back and closure flap with the forward ends of the applicating faces moving in the direction of movement of the envelope, means for containing a supply of pressure sealing gum, pickup and transfer means for picking up the pressure sealing gum from said supply means and for transferring the gum to the applicating faces of both rotary members in a substantially uniform coating of pressure sealing gum from said contact points while excess of said gum is being pushed backwardly toward the trailing ends of the applicating faces and which pressure sealing gum tends to collect on said trailing ends in blobs when the trailing ends of the applicating faces ride out of said transfer contact, and means for spreading the blobs of pressure sealing gum to prevent thickened terminals at the trailing ends of said stripes of pressure sealing gum.

6. An apparatus for applying spaced apart parallel stripes of pressure sealing gum to the back and closure flap of an envelope as described in claim 5 wherein said means for spreading the blobs comprise a nozzle forwardly of and in alignment with each rotary member for directing separate streams of pressure medium into propelling contact with said blobs and along the stripes of pressure sealing gum to distribute the blobs forwardly along said stripes.

7. An apparatus for applying stripes of pressure sealing gum to envelopes as described in claim 5 wherein said means for spreading the blobs comprises a resilient tongue forming the trailing end of each of the applicating faces of said rotary members, said tongues being yieldable for permitting the major portion of the blobs to pass upon the pickup and transfer means with the remaining portion being uniformly applied on said resilient tongues.

8. An apparatus for applying stripes of pressure sealing gum to envelopes as described in claim 5 wherein said pickup and transfer means includes a rotary pickup member and at least one transfer member having the face thereof arcuate for contact with said applicating faces, said pickup and transfer members having driving connection with said rotary members to keep said arcuate face and said applicating faces in timed relation with trailing ends of the applicating faces trailing corresponding ends of the arcuate face to leave trailing portions of said applicating faces free of contact to accommodate the blobs upon said trailing portions and wherein said spreading means is the trailing portions of said applicating faces.

9. An apparatus for applying a stripe of pressure sealing gum to work pieces while the work pieces are under movement along a fixed path of travel, a rotary member having an applicating face of a width corresponding with the width of the stripe to be applied and having a forward end and a trailing end spaced apart according to length of said stripe, means for rotatably supporting said rotary member to bring the applicating face into contact with the work pieces with the forward end of the applicating face moving in the direction of movement of the work pieces, means for containing a supply of pressure sealing gum, pickup and transfer means for picking up said gum from the supply means and carrying the gum for transfer contact with the applicating face while the forward end of the applicating face is moving toward contact with the work pieces to apply the pressure sealing gum transferred thereon in substantially uniform thickness to the work pieces and while the excess of said gum is being pushed backwardly toward the trailing end of the applicating face to collect on said trailing end in a blob as the trailing end of the applicating face rides out of said transfer contact, means for spreading the blob to prevent accumulation of the blob at the trailing end of said stripes, and means under the rotary member for discharging an air jet under the work pieces to hold said work pieces in contact with the applicating face of said rotary member.

References Cited in the file of this patent

UNITED STATES PATENTS

| | | |
|---|---|---|
| 1,545,443 | Oman | July 7, 1925 |
| 1,672,842 | Wagner et al. | June 5, 1928 |
| 1,741,382 | Stokes | Dec. 31, 1929 |
| 2,000,325 | Ford et al. | May 7, 1935 |
| 2,130,241 | MacLaurin | Sept. 13, 1938 |
| 2,344,427 | Staude | Mar. 14, 1944 |
| 2,438,788 | Palmer | Mar. 30, 1948 |